FREQUENCY RESPONSIVE CONTROL DEVICE

Filed Sept. 8, 1954 3 Sheets-Sheet 1

INVENTOR.
GEORGE C. ELDRIDGE JR.
BY Howson & Howson
ATTYS.

Nov. 4, 1958 G. C. ELDRIDGE, JR 2,858,773

FREQUENCY RESPONSIVE CONTROL DEVICE

Filed Sept. 8, 1954 3 Sheets-Sheet 2

INVENTOR:
GEORGE C. ELDRIDGE JR.
BY Howson & Howson
ATTYS.

Nov. 4, 1958 G. C. ELDRIDGE, JR 2,858,773

FREQUENCY RESPONSIVE CONTROL DEVICE

Filed Sept. 8, 1954 3 Sheets-Sheet 3

INVENTOR:
GEORGE C. ELDRIDGE JR.
BY Howson & Howson
ATTYS.

United States Patent Office 2,858,773
Patented Nov. 4, 1958

2,858,773

FREQUENCY RESPONSIVE CONTROL DEVICE

George C. Eldridge, Jr., Wenonah, N. J.

Application September 8, 1954, Serial No. 454,740

3 Claims. (Cl. 104—149)

This invention relates to electrical devices for selectively controlling mechanisms such as relays by means of electrical networks which transmit alternating current power at only certain narrow frequency bands, such networks being commonly referred to as narrow band pass filters.

Heretofore various devices of this general character have been proposed which have depended on resonant combinations of simple inductors and capacitors, or on the oscillating characteristics of certain crystals, or on the mechanical transmission of power between two portions of a solid body which resonates at certain frequencies.

The principal object of the present invention is to provide a device which passes a very narrow band of frequencies with a high ratio of power at transmitted frequency to power at other frequencies; which is highly efficient; which requires only a small space; which without resorting to amplification passes sufficient power to operate control mechanisms such as relays; and which within a broad range of frequencies has a relatively high impedance except at the desired narrow frequency band.

This device is superior to prior devices of the character above mentioned in that it accomplishes all of these objectives whereas the prior devices do not.

By this invention, there is provided a device which operates on an entirely different principle than do the aforementioned prior devices. In accordance with a preferred embodiment of this invention, the transmission of the desired frequency is made to depend upon the unbalancing of a bridge circuit, one element of which preferably consists of an inductor and capacitor in parallel, the impedance of which combination is changed at a certain frequency by magnetostrictive oscillation of the core of the inductor, which changes the impedance of the inductor and thereby the impedance of the inductor-capacitor combination. The bridge circuit may be of various forms, such as an impedance bridge of the Wheatstone type.

The invention may be fully understood by reference to the accompanying drawings, wherein Fig. 1 is a view, partly in elevation and partly in section, of an inductor whose impedance changes when the core of the inductor oscillates;

Figure 1:
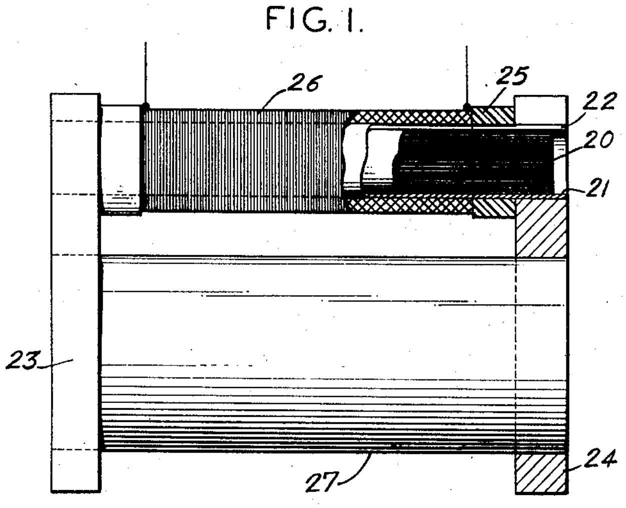
Figure 2:
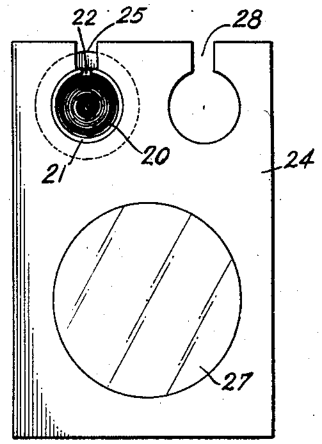
Fig. 2 is an elevational end view of the same.

Referring more particularly to the drawings, in Figs. 1 and 2 there is shown an inductor with a core 20 of thin sheet nickel or other magnetostrictive material which has a high resistance surface layer and which is rolled in the manner of a scroll. The core preferably is made in this form in order to minimize eddy currents. The core is loosely contained in a brass tube 21 which is slit longitudinally at 22. This brass tube is inserted into apertured soft iron end pieces 23 and 24 which are slit as shown at 25. The slits in the brass tube and in the iron end pieces are for the purpose of preventing the flow of current around the tube and iron end pieces. Surrounding the brass tube is a winding 26. A permanent magnet 27 is also inserted into the two apertured iron end pieces. This permanent magnet establishes a constant unidirectional magnetic field through the nickel core via the iron end pieces. As shown in Fig. 2, each iron end piece may have a second slotted hole 28 to accommodate a second inductor which is omitted in the illustration.

The nickel core 20 oscillates vigorously in a longitudinal direction when an alternating voltage impressed across the winding 26 has a frequency $$f=\frac{w}{2L}$$

where $w$ is the velocity of a mechanical wave through nickel and L is the length of the nickel core. When this vigorous oscillation occurs, the impedance of the inductor is different than when the core is not oscillating. The biasing magnetic field provided by the permanent magnet 27 is necessary for the core to oscillate at the frequency of the applied voltage. This biasing field also greatly enhances the intensity of the oscillation.

Figures 3, 4, 9:
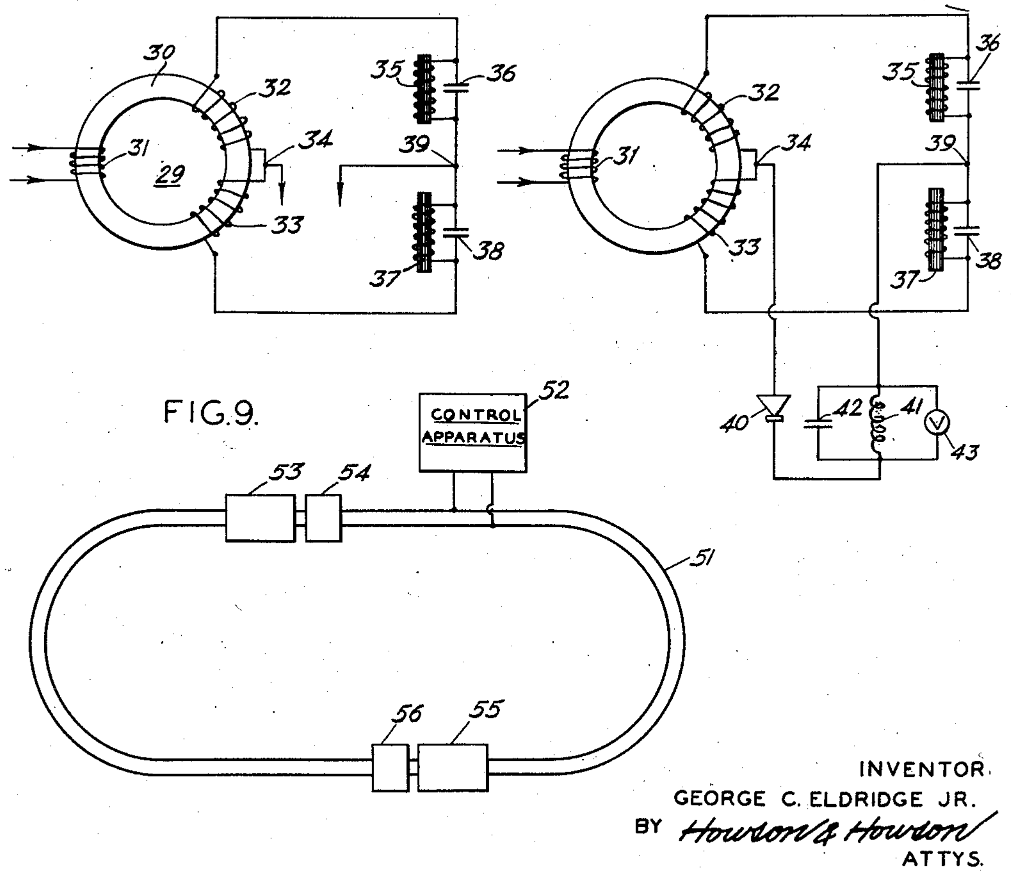
Fig. 3 is a diagrammatic illustration of a bridge circuit which may be employed.
Fig. 4 is a similar illustration of the bridge circuit with a network connected to the output terminals.
Fig. 9 is a simple illustration of a train control system embodying the present invention.

In Fig. 3 there is shown a bridge circuit with a transformer 29 having a core 30 preferably toroidal in form and preferably consisting of thin iron-nickel ribbon wrapped around the periphery of a ceramic core. The transformer has a primary winding 31 which is connected to the source of power, and two secondary windings 32 and 33 which are similar. The two secondary windings are connected together at a "midpoint" 34 in series aiding relation.

The extreme ends of the transformer secondaries are connected to the extreme ends of two parallel inductor-capacitor combinations 35, 36 and 37, 38, these two combinations being connected together at a "midpoint" 39. The two inductors may be mounted in a structure of the character shown in Figs. 1 and 2. The two inductor-capacitor combinations are similar except for a small difference in the lengths of the cores and are antiresonant at a frequency near the resonant frequencies of the cores. Practically a condition approaching antiresonance is manifested by each inductor-capacitor combination throughout the range of frequencies used in the application of this device except at those frequencies which cause vigorous oscillation of the magnetostrictive cores.

At frequencies other than the resonant frequencies of the two magnetostrictive cores, the bridge circuit consisting of the two transformer secondaries and the two parallel combinations is balanced and therefore no voltage exists between points 34 and 39. However at a frequency coinciding with the resonant frequency of one of the cores, the core oscillates longitudinally. When this occurs, the impedance of the inductor is different than when the core is not oscillating. This change in impedance disturbs the condition of antiresonance of the inductor-capacitor combination which obtains just below and just above the natural oscillating frequency of the core. The impedance of the inductor-capacitor combination involving the oscillating core is relatively very low while the impedance of the other combination involving the core which is not oscillating is relatively very high. This results in a high degree of unbalance in the bridge circuit which causes a relatively large voltage between the bridge points 34 and 39.

When several different frequencies are simultaneously impressed on the transformer primary 31 the only frequencies that will cause a voltage between points 34 and 39 are those within the two narrow bands of frequencies that cause one or the other of the nickel cores to oscillate vigorously.

Since the unbalancing of the bridge depends on the magnetostrictive oscillation of a core in only one of the two inductors, obviously the other inductor could have a non-magnetostrictive core. However, the two inductors preferably are made alike (except for the difference in core length) as a convenient means of insuring a good balance at frequencies other than the natural frequency of the oscillating core.

If instead of inductor-capacitor combinations for the two arms of the bridge, only inductors as described were used, the device would still be operable although not as efficiently.

Fig. 4 shows the same bridge circuit as shown in Fig. 3, to which a load circuit has been added consisting of a rectifier 40 in series with a 50 ohm relay winding 41 across which is connected a condenser 42. A voltmeter 43 measures the D. C. voltage impressed on the relay winding.

Figure 5:
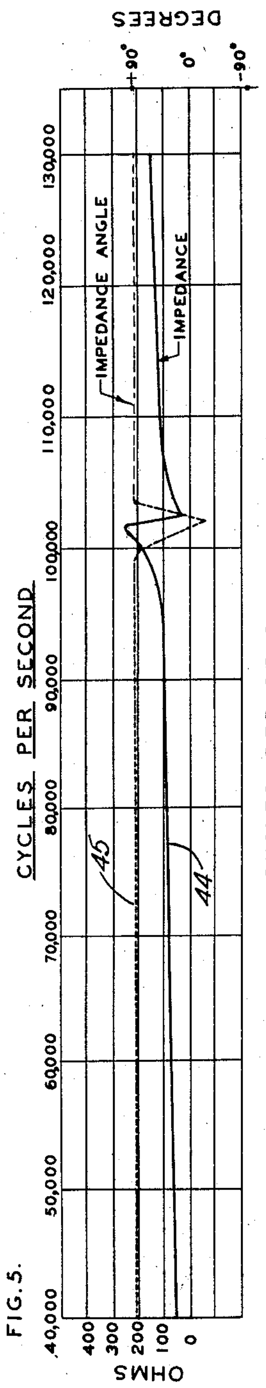
Fig. 5 is a curve showing, for various frequencies, the measured impedance and impedance angle of an inductor with a magnetostrictive core 24.6 millimeters long.

Fig. 5 shows two curves 44 and 45 representing, for various frequencies, the measured impedance and the impedance angle of an inductor with a magnetostrictive core 24.6 millimeters long. The abrupt change occurring in the vicinity of 102,000 cycles per second is caused by the oscillation of the core.

Figure 6:
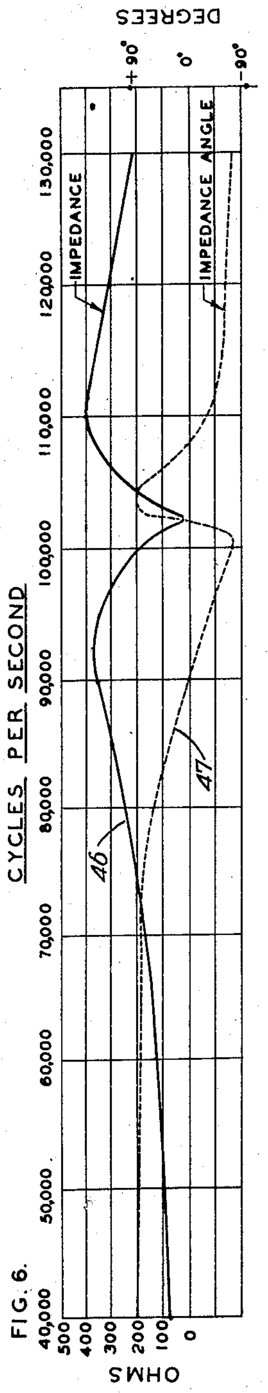
Fig. 6 is a curve showing, for various frequencies, the measured impedance and impedance angle of a parallel combination consisting of such an inductor and a 0.015 microfarad capacitor.

Fig. 6 shows two curves 46 and 47 representing, for various frequencies, the measured impedance and the impedance angle of a parallel combination of the same inductor and a 0.015 microfarad capacitor. The capacitance of 0.015 was selected in order to obtain a general condition approaching antiresonance in the frequency range selected for operation. It will be noted that the addition of the capacitor results in raising the impedance throughout the range shown except at the natural oscillating frequency of the core.

Figure 7:
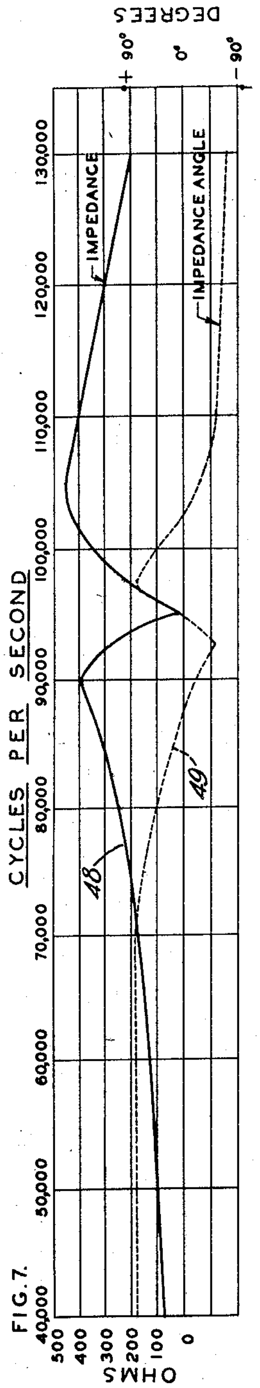
Fig. 7 is a curve showing, for various frequencies, the measured impedance and impedance angle of a similar inductor-capacitor parallel combination employing a core that is 26.4 millimeters long.

Fig. 7 shows two curves 48 and 49 representing, for various frequencies, the measured impedance and the impedance angle of a similar inductor-capacitor parallel combination except that the core is 26.4 millimeters long. It will be noted that at a narrow frequency band in the vicinity of 95,000 cycles per second the impedance of this inductor-capacitor combination is very low. The impedance of the combination represented by Fig. 6 is very high at 95,000 C. P. S. At a narrow frequency band in the vicinity of 102,000 C. P. S. the opposite condition obtains. Therefore, when the two combinations represented by Fig. 6 and Fig. 7 are used as two arms of a bridge circuit as in Figs. 3 and 4, there exists a large unbalance in the vicinity of 95,000 C. P. S. and in the vicinity of 102,000 C. P. S., but at frequencies above and below these two narrow bands the bridge is substantially balanced since the impedances of the two bridge arms are substantially equal both in value and angle.

Figure 8:
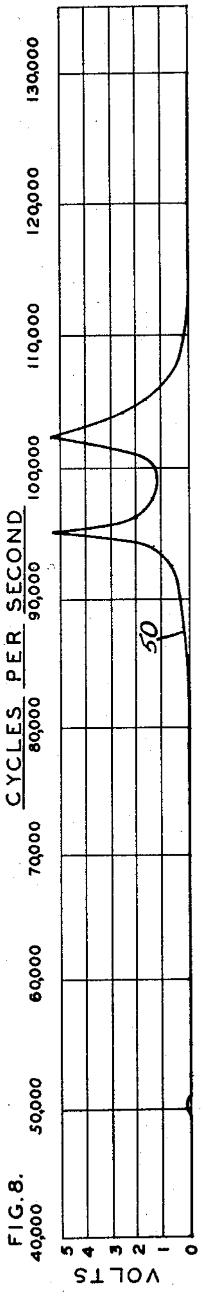
Fig. 8 is a curve showing, for various frequencies, the measured voltage across the relay winding of Fig. 4.

Fig. 8 shows a curve 50 representing, for various frequencies, the measured voltage across the relay winding 41 of Fig. 4. The relay winding used in these measurements had a resistance of 50 ohms. It will be noted that in the narrow frequency bands in the vicinity of 95,000 C. P. S. and in the vicinity of 102,000 C. P. S. the voltage across the winding is high but at frequencies above and below these bands the voltage is low. In a practical application, the impressed control voltage can of course be restricted to either 95,000 C. P. S. or 102,000 C. P. S.

While the present invention is intended for use for any purpose to which it may be applicable, it is particularly intended for use to control model railroad trains. Thus it may be used to control independently two trains operating on the same track. Fig. 9 shows in simple form a track 51 to which control apparatus 52 is connected. Blocks 53, 54 and 55, 56 represent locomotives and their tenders on the same track.

Figure 10:
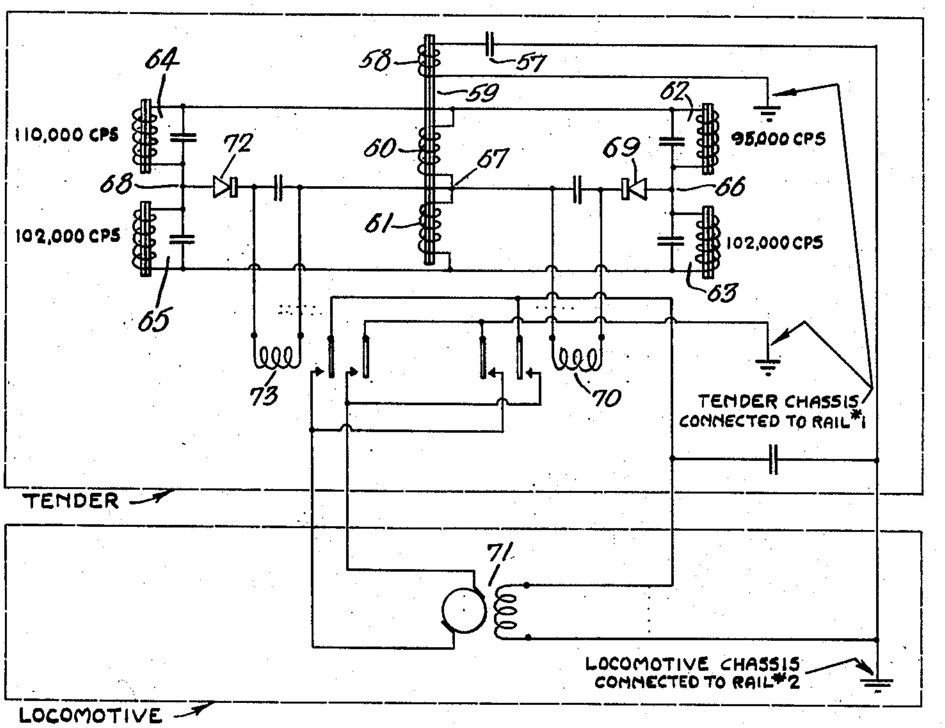
Fig. 10 is a diagrammatic illustration of a circuit for controlling a model electric railroad train.
Figure 11:
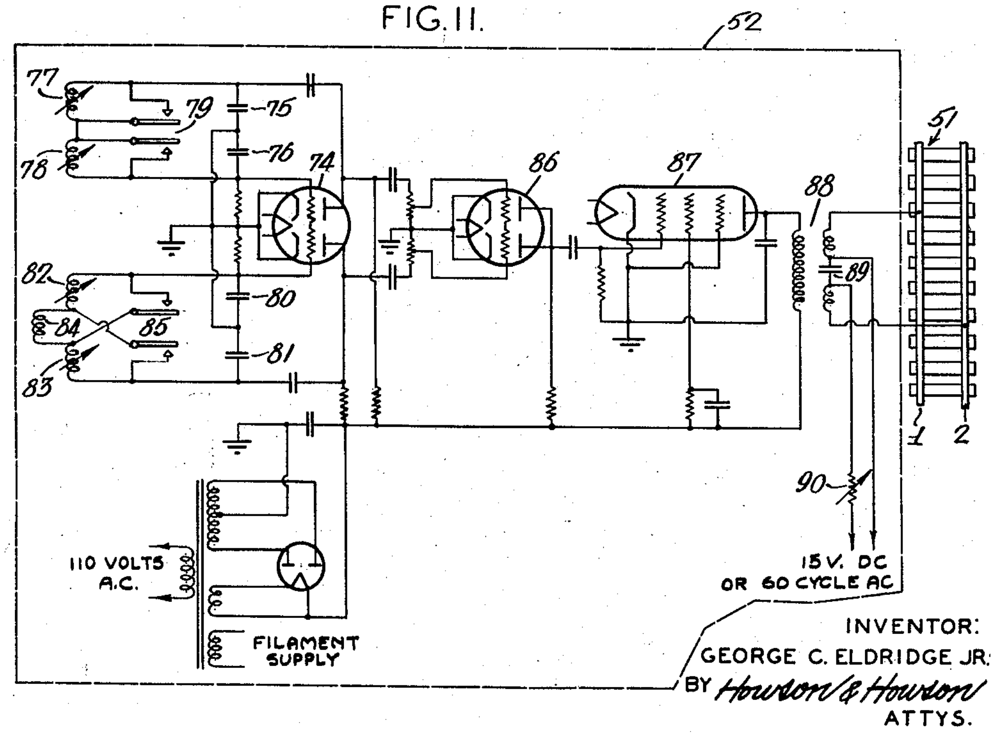
Fig. 11 is a diagrammatic illustration of a vacuum tube generator used to produce two control frequencies for model train control.

Fig. 10 shows diagrammatically the apparatus provided on each train, e. g. on the locomotive and tender, while Fig. 11 shows a preferred form of the control apparatus.

Two control frequencies are impressed on the track and are superimposed on the usual D. C. or 60 cycle A. C. track voltage. These control frequencies are conducted through a capacitor 57 (Fig. 10) to the primary winding 58 of a transformer 59. The transformer core need not be toroidal. In Fig. 10 a straight core is shown for simplicity. Across the extreme ends of the two secondary windings 60 and 61 are connected two pairs of inductor-capacitor combinations 62 to 65, instead of one pair as previously described. All four inductors may be mounted in the same iron end pieces which may have four slotted holes in each instead of the two slotted holes shown in Fig. 2. One pair of inductors has cores with natural oscillating frequencies of say 95,000 C. P. S. and 102,000 C. P. S. respectively. The other pair of inductors has cores with natural oscillating frequencies of say 102,000 C. P. S. and 110,000 C. P. S. respectively. The control voltage normally may have a frequency of 55,000 C. P. S. and can be changed to either 95,000 C. P. S. or 110,000 C. P. S. When the control voltage is at the normal frequency of 55,000 C. P. S., practically no voltage exists between points 66 and 67 or between points 67 and 68. However, when the frequency is changed to 95,000 C. P. S. a voltage exists between points 66 and 67. Current flows in one direction through the rectifier 69. The resulting direct current flows through the winding of relay 70. The contacts of this relay close, connecting the track to the locomotive motor 71 in such a direction as to cause the train to run forward. When the frequency of the control voltage is changed to 110,000 C. P. S., current flows through rectifier 72 and the winding of relay 73. The relay contacts connect the track to the motor 71 in such a direction as to cause the train to run backward. It will be noted that only one core of each pair is made to oscillate. The other core of each pair is for balancing purposes only.

The other train is equipped in exactly the same manner except that one pair of nickel cores has natural oscillating frequencies of say 76,000 C. P. S. and 82,000 C. P. S. respectively and the other pair has natural oscillating frequenceis of say 82,000 C. P. S. and 88,000 C. P. S. respectively. A second control voltage of normally 55,000 C. P. S. can be changed to either 76,000 C. P. S. or 88,000 C. P. S. and controls the second train in the same manner.

In this two-train system, two transformer primaries are connected across the track in parallel. Across each pair of secondaries are connected two networks each consisting of two inductor-capacitor combinations as shown in Fig. 10. At a frequency which results in power being delivered to one of the relays via an inductor with an oscillating core, the shunting effect of all the other inductor-capacitor combinations is low because at that frequency the impedances of all the other combinations are much higher than the impedance of the operating inductor-capacitor combination.

This system is not limited to the control of only two trains. By providing additional control frequencies, additional trains can be controlled.

Fig. 11 shows a preferred form of the generator which produces the two control voltages. The generator consists of two oscillators each utilizing one-half of a twin triode, a second twin triode in which the two control voltages are mixed, and a power output stage consisting essentially of a power pentode and an output transformer. A conventional power supply provides the operating voltages.

The oscillating circuit associated with one-half of the first twin triode 74 comprises two capacitors 75 and 76 and two variable inductors 77 and 78. A three-position switch 79 is provided. With the switch in the upper position, inductor 77 is short-circuited and inductor 78 is adjusted so that the resulting frequency is 76,000 cycles per second. With the switch in the lower position, inductor 78 is short-circuited and inductor 77 is adjusted so that the resulting frequency is 88,000 C. P. S. With the switch in the mid position, the inductors are in series and the frequency is approximately 55,000 C. P. S.

The oscillating circuit associated with the other half of the twin triode 74 comprises two capacitors 80 and 81, two inductors 82 and 83 which are variable, and a third inductor 84 which is fixed. With switch 85 in its upper position, inductors 82 and 84 are short-circuited and inductor 83 is adjusted so that the resulting frequency is 95,000 C. P. S. With the switch in its lower position, inductors 83 and 84 are short-circuited and inductor 82 is adjusted so that the resulting frequency is 110,000 C. P. S. With the switch in the mid position, all three inductors are in series and the frequency is approximately 55,000 C. P. S. Since the inductors 82 and 83 are of lower inductance than inductors 77 and 78, the additional inductor 84 is required in order that the "mid-point" frequency will have a sufficiently low value such as 55,000 C. P. S.

Switches 79 and 85 are preferably manually operated switches which in the model train application each tend to control the direction of movement of one of the locomotives. Manipulation of either of these switches will cause one of the locomotives to move forward, backward, or remain stationary. When, and how, the switches are operated will be based upon the judgment of one operating the model railroads.

The outputs of the two oscillators are conducted separately to the grids of the second twin triode 86. The plates of the second twin triode are connected in parallel to the control grid of a power pentode 87. An output transformer 88 reduces the output impedance to a value which is low compared to the impedance of the train lamps and other accessories at the control frequencies. This reduction is necessary in order that the lamps and other accessories will have a negligible shunting effect on the control voltages and also in order that the control voltages will be sufficiently low to avoid damaging the train lamps.

The secondary of the output transformer consists of two windings between which is connected a 2 microfarad capacitor 89. The extreme ends of the secondary windings are connected to the track. The source of D. C. or 60 cycle A. C. voltage for driving the trains is connected across the 2 microfarad capacitor 89. In this manner both the control voltages and the driving voltage are impressed on the track. A rheostat 90 is inserted in one of the driving power leads to control the driving voltage on the track.

While certain embodiments of the invention have been illustrated and described, the invention is not limited thereto but contemplates such modifications and further embodiments as may occur to those skilled in the art.

I claim:

1. In a system for the control of a model electric train having a reversible electric drive motor operated by track voltage, an electrical bridge on the train and comprising a pair of bridge networks having a common input circuit and separate output circuits, said bridge networks being disposed on opposite sides of the bridge and each including a pair of arms having a capacitor and an inductor arranged in parallel therein, each inductor having a magnetostrictive core, the magnetostrictive core in one arm being responsive to oscillations of a different predetermined frequency than that of the magnetostrictive core in the other arm, means for selectively supplying to said common input circuit bridge-unbalancing voltages of different predetermined frequencies corresponding to the different predetermined frequencies of the respective magnetostrictive cores, and means for changing the polarity of the track-voltage supplied to said motor to reverse the direction of rotation thereof including a pair of relays connected to the respective output circuits of said bridge networks, each of said connections between said relays and said output circuits including a series-connected rectifier, whereby the relays are selectively energized from the output circuits of the respective bridge networks when the bridge-unbalancing voltages are applied to said common input circuit.

2. A system according to claim 1, including a transformer having an input primary winding and two secondary windings, one secondary winding being included in each of said bridge networks.

3. A system for control of a plurality of model electric trains, comprising a pair of bridge networks on each train according to claim 1, the bridge networks on each train being responsive to frequencies different from the response frequencies of the networks on each other train.

References Cited in the file of this patent

UNITED STATES PATENTS

| | | |
|---|---|---|
| 1,778,465 | Ozanne | Oct. 14, 1930 |
| 1,827,860 | Thorp | Oct. 20, 1931 |
| 2,048,067 | Hansell | July 21, 1936 |
| 2,073,443 | Cardoza | Mar. 9, 1937 |
| 2,166,359 | Lakatos | July 18, 1939 |
| 2,170,206 | Mason | Aug. 22, 1939 |
| 2,592,721 | Mott | Apr. 15, 1952 |
| 2,622,542 | Bonanno | Dec. 23, 1952 |
| 2,630,482 | Bostwick | Mar. 3, 1953 |
| 2,631,193 | Roberts | Mar. 10, 1953 |
| 2,685,844 | Short et al. | Aug. 10, 1954 |

FOREIGN PATENTS

| | | |
|---|---|---|
| 326,769 | Great Britain | Mar. 17, 1930 |